United States Patent
Swist

(10) Patent No.: US 8,662,247 B1
(45) Date of Patent: Mar. 4, 2014

(54) BRACKET ASSEMBLY FOR AN AUDIO LOUDSPEAKER SYSTEM

(75) Inventor: Lawrence P. Swist, Katonah, NY (US)

(73) Assignee: Guzauski-Swist Audio Systems, LLC, White Plains, NY (US)

( * ) Notice: Subject to any disclaimer, the term of this patent is extended or adjusted under 35 U.S.C. 154(b) by 1 day.

(21) Appl. No.: 13/588,818

(22) Filed: Aug. 17, 2012

(51) Int. Cl.
*F16F 7/00* (2006.01)

(52) U.S. Cl.
USPC .......................................... 181/207; 248/638

(58) Field of Classification Search
USPC .......................................... 181/207; 248/638
See application file for complete search history.

(56) References Cited

U.S. PATENT DOCUMENTS

| | | | |
|---|---|---|---|
| 4,031,318 A | 6/1977 | Pitre | |
| 4,251,045 A * | 2/1981 | Meyerle | 248/619 |
| 4,284,844 A | 8/1981 | Belles | |
| 4,591,020 A | 5/1986 | Hruby, Jr. | |
| 4,633,973 A * | 1/1987 | Kitano | 181/207 |
| 4,757,544 A | 7/1988 | Guy | |
| 4,884,655 A * | 12/1989 | Freadman et al. | 181/145 |
| 5,298,693 A * | 3/1994 | Heijn | 181/199 |
| 5,804,776 A | 9/1998 | Bizlewicz | |
| 6,786,298 B1 * | 9/2004 | Chang et al. | 181/207 |
| 6,896,097 B2 * | 5/2005 | Nishikawa et al. | 181/199 |
| 7,016,513 B2 | 3/2006 | Noselli | |
| 8,042,782 B2 * | 10/2011 | Lippert et al. | 248/317 |
| 2003/0016493 A1 | 1/2003 | Hiratomo et al. | |
| 2006/0086874 A1 | 4/2006 | Habel et al. | |
| 2007/0075202 A1 * | 4/2007 | Gordon | 248/289.11 |
| 2008/0267429 A1 | 10/2008 | Tracy | |
| 2009/0206229 A1 | 8/2009 | Nesch | |
| 2009/0242322 A1 * | 10/2009 | Tsai | 181/207 |
| 2009/0283658 A1 * | 11/2009 | Keene | 248/559 |

* cited by examiner

*Primary Examiner* — Forrest M Phillips
(74) *Attorney, Agent, or Firm* — Hoffmann & Baron, LLP

(57) ABSTRACT

A bracket assembly for an audio system that includes a mounting bracket slidably connected to a sub-assembly for attaching first and second loudspeaker enclosures of an audio loudspeaker system. The sub-assembly includes a plurality of vibration isolators disposed between a lower mounting bracket and an upper mounting bracket. The mounting bracket is attached to a first loudspeaker enclosure and the upper mounting bracket is attached to a second enclosure. First and second arms on the mounting bracket are inserted into first and second tracks on the lower mounting bracket to slidably attach the sub-assembly to the mounting bracket.

20 Claims, 10 Drawing Sheets

BRACKET ASSEMBLY FOR AN AUDIO LOUDSPEAKER SYSTEM

FIELD OF THE INVENTION

The present invention is a bracket assembly for an audio loudspeaker system that provides improved sound quality. In particular, the present invention relates to a bracket assembly for an audio loudspeaker system that uses vibration isolators to dampen vibrations and improve sound quality.

BACKGROUND OF INVENTION

Audio loudspeaker systems generally include more than one loudspeaker in the same enclosure in order to cover the audible frequency range. Typically, the audio signal received by the loudspeaker system is divided into three frequency ranges and distributed to three loudspeakers having different diameters. The low frequencies are sent to a large diameter loudspeaker, the mid-range frequencies are sent to a mid-sized loudspeaker and the higher frequencies are sent to a loudspeaker with a small diameter. In general, the large diameter loudspeakers used for the low frequency range produce more vibration than the mid-range and high range loudspeakers. The vibration from the low frequency loudspeakers often affects the sound quality of the loudspeakers used for the mid-range and higher frequencies.

Attenuation of an audio signal is commonly employed in three-way speaker systems using crossover networks between the power amplifier and the loudspeaker drivers to divide the amplifier's signal into the necessary frequency bands before being delivered to the individual drivers (i.e., loudspeakers). The crossover network separates the input signal into different frequency ranges suited to each driver (e.g., a three-way loudspeaker system would include a woofer, a mid-range driver and a tweeter). The drivers receive only the power in their usable frequency range (the range they were designed for), thereby reducing distortion in the drivers and interference between them. However, this does not solve the vibration problems that are inherent with larger loudspeakers that are used for the lower frequency range.

One of the problems encountered with three-speaker audio systems, as well as other loudspeaker systems that have more than one loudspeaker in an enclosure, is that the vibration from one speaker in the enclosure can affect the sound quality of the other loudspeaker(s) in the enclosure. Various attempts have been made to isolate the loudspeakers from each other in order to reduce the effects of vibration, but they have not been entirely successful. Therefore, there is a need for an audio loudspeaker system with improved vibration isolation between the loudspeakers that can provide high sound quality.

SUMMARY OF THE INVENTION

In accordance with the present invention, a bracket assembly for an audio loudspeaker system is provided. The bracket assembly includes a mounting bracket and a sub-assembly having a lower mounting bracket, an upper mounting bracket and a plurality of vibration isolators. Preferably, the bracket assembly attaches first and second enclosures of an audio loudspeaker system. The mounting bracket includes a base with a pair of opposing sides, a first end, a second end and first and second arms having first and second edges, respectively, extending outwardly from the first end of the mounting bracket to distal ends. Preferably, the mounting bracket base is substantially rectangular and flat and has one or more apertures for attaching the mounting bracket to a structure, preferably a loudspeaker enclosure. The arms define a channel therebetween and the edges extend into the channel. The mounting bracket can have a pair of side walls extending from the opposing sides of the base to the side of the first and second arms opposite the first and second edges, respectively. Each of the pair of side walls has a triangular shape with first and second sides connecting to one of the opposing sides of the base and the first or second arm, respectively, and a third side that extends between the first or second arm and one of the opposing sides of the base. The mounting bracket is adapted for attachment to a first enclosure of the audio loudspeaker system.

The lower mounting bracket includes a lower plate having a top surface, first and second sides extending between first and second ends and a U-shaped notch in the first side of the lower plate. Preferably, the lower plate is substantially rectangular and flat and has at least one aperture on either side of the U-shaped notch for attachment of the lower mounting bracket to at least one of the plurality of vibration isolators. The U-shaped notch has opposing side edges that are parallel to the first and second ends of the lower plate. First and second walls are connected to the opposing side edges of the U-shaped notch and extend downwardly from the top surface of the lower plate to first and second lips that extend away from the U-shaped notch to form first and second tracks, which are open on one side and bounded by the lower plate, the first or second walls and the first or second lips, respectively.

The upper mounting bracket includes an upper plate having first and second ends and first and second bottom wall sections connected to the first and second ends by first and second end walls. Preferably, the upper plate is substantially rectangular and flat and has one or more apertures for attaching the upper plate to a structure, preferably a loudspeaker enclosure. The first and second bottom wall sections extend parallel to and below the upper plate. Preferably, the first and second bottom wall sections each have at least one aperture for attachment of the upper mounting bracket to at least one of the plurality of vibration isolators. The upper mounting bracket is adapted for attachment to a second enclosure of the audio loudspeaker system.

The plurality of vibration isolators is disposed between the lower mounting bracket and the upper mounting bracket. Preferably, the vibration isolators are compressible and have two fasteners located on opposite sides. The fasteners can be compression fittings that are secure in the apertures by friction. Preferably, the fasteners are threaded studs, which are inserted in the apertures and secured by a nut. However, the fasteners can also be welded to the upper and lower mounting brackets or attached using an adhesive. The sub-assembly is formed by inserting one fastener into one of the apertures in the lower plate and inserting the other fastener into one of the apertures in one of the bottom wall sections of the upper mounting bracket. Preferably, a total of four vibration isolators are used to attach the lower mounting bracket and the upper mounting bracket.

After the sub-assembly is formed and attached to the second enclosure of the audio loudspeaker system and the mounting bracket is attached to the first enclosure, the first and second tracks of the lower mounting bracket slidably receive the first and second edges of the mounting bracket arms to attach the first enclosure to the second enclosure.

BRIEF DESCRIPTION OF THE FIGURES

The preferred embodiments of the bracket assembly for an audio loudspeaker system of the present invention, as well as other objects, features and advantages of this invention, will be apparent from the accompanying drawings wherein.

DETAILED DESCRIPTION OF THE INVENTION

Figure 1:
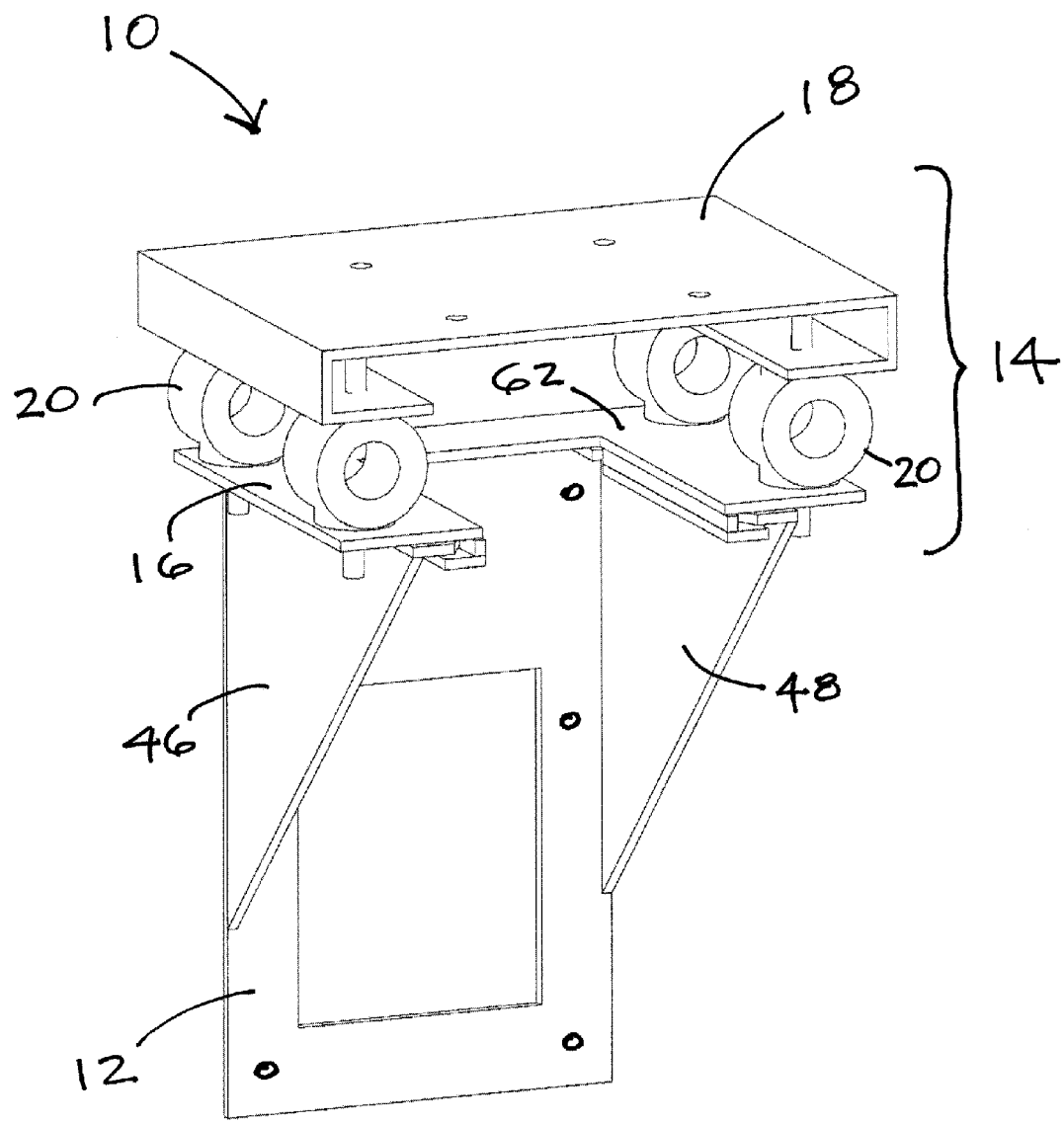
FIG. 1 is a front perspective view of the bracket assembly for an audio loudspeaker system.

The present invention is a bracket assembly for an audio loudspeaker system that includes a mounting bracket and a sub-assembly having a lower mounting bracket connected to an upper mounting bracket by a plurality of vibration isolators. The mounting bracket is attached to a first loudspeaker enclosure and the sub-assembly is attached to a second loudspeaker enclosure. The sub-assembly slidably receives the mounting bracket to connect the first and second loudspeaker enclosures. The term loudspeaker enclosure, as used herein, refers to a housing or cabinet for one or more loudspeakers. Such housings are typically made from wood but the invention is not limited by the construction of the enclosure and other materials can be used.

The mounting bracket includes a base with a pair of opposing sides extending between first and second ends and a plurality of apertures for securing the mounting bracket to a structure, preferably the first enclosure of the audio loudspeaker system. Preferably, the base has a substantially flat and rectangular shape. Two arms extend perpendicularly from the first end of the base on opposing sides to distal ends and form a channel therebetween. The sides of the arms opposite the channel are connected to the side edges of the base by side walls that provide stability and structural support to the arms. Preferably, the side walls are triangularly-shaped and extend from the arms to the opposing sides of the base. The arms have first and second edges that extend away from the side walls and into the channel. Preferably, the edges are substantially flat and perpendicular to the side walls.

The sub-assembly includes a lower mounting bracket that has a lower plate with a top surface, first and second sides extending between first and second ends and a U-shaped notch in the first side. Preferably, the lower plate is substantially rectangular and flat. The U-shaped notch has two opposing walls that are parallel to the first and second ends and extend downwardly from the top surface of the lower plate to first and second lips. The lips extend away from the U-shaped notch to form first and second tracks, each bounded on three sides (i.e., by the lower plate, one of the opposing walls and one of the lips) and having an open side. A plurality of apertures in the lower plate on either side of the U-shaped notch can be used for securing vibration isolators to the lower mounting bracket.

The sub-assembly also includes the upper mounting bracket, which has an upper plate with a top surface and first and second sides that extend between first and second ends. Preferably, the upper plate is substantially rectangular and flat. First and second end walls extend downwardly from the top surface on the first and second ends, respectively, and are substantially perpendicular to the upper plate. First and second bottom wall sections are connected to the ends of the first and second end walls, respectively, and extend under and are substantially parallel with the upper plate. A plurality of mounting apertures in the upper plate is adapted to attach the upper mounting bracket to an audio loudspeaker cabinet and one or more apertures in each of the bottom wall sections can be used for securing vibration isolators to the upper mounting bracket.

The vibration isolators can be formed from a compressible material, such as a rubber or foam, and are disposed between the upper mounting bracket and the lower mounting bracket to minimize vibration therebetween. However, the vibration isolators can also be springs (e.g., coil or leaf springs disposed between two plates) designed to provide the same cushioning effect as the isolators made from compressible materials. Preferably, the vibration isolators have two fasteners, such as bolts or threaded studs, on opposing sides for securing the vibration isolators to both the upper mounting bracket and the lower mounting bracket. One fastener is inserted into one of the apertures in the lower plate and one fastener is inserted into one of the apertures in one of the bottom wall sections of the upper mounting bracket. The vibration isolators can also be ring-shaped and a bolt can be passed through the opening and a nut used to secure the upper mounting plate and the lower mounting plate with the isolator disposed in between. A preferred vibration isolator is the RLF mount manufactured by Anti-Vibration Methods (Rubber) Co, Ltd., Warminster, United Kingdom. Besides fasteners, other means for securing the vibration isolators to both the upper mounting bracket and the lower mounting bracket that are well known to those skilled in the art (such as compressive fittings, adhesives or welding) can be used and are within the scope of the invention.

The sub-assembly is formed by attaching the vibration isolators to the lower mounting bracket on one side and the upper mounting bracket on the other side. The subassembly is then attached to the second loudspeaker enclosure. The mounting bracket is attached to the first speaker enclosure and then connected to the sub-assembly. Preferably, the first and second tracks of the lower mounting bracket slidably receive the first and second edges of the mounting bracket to attach the sub-assembly to the mounting bracket.

The bracket assembly for the audio loudspeaker system is now described in more detail with respect to the figures, which show preferred embodiments of the bracket assembly. FIG. 1 shows the bracket assembly 10, which includes the mounting bracket 12 slidably attached to the sub-assembly 14. The sub-assembly 14 includes a lower mounting bracket 16, an upper mounting bracket 18 and four vibration isolators 20 disposed therebetween. The vibration isolators 20 isolate the upper mounting bracket 18 from the lower mounting bracket 16 so that any vibrations affecting the mounting bracket 12 are dampened before they are transmitted to the upper mounting bracket 18.

Figure 2:
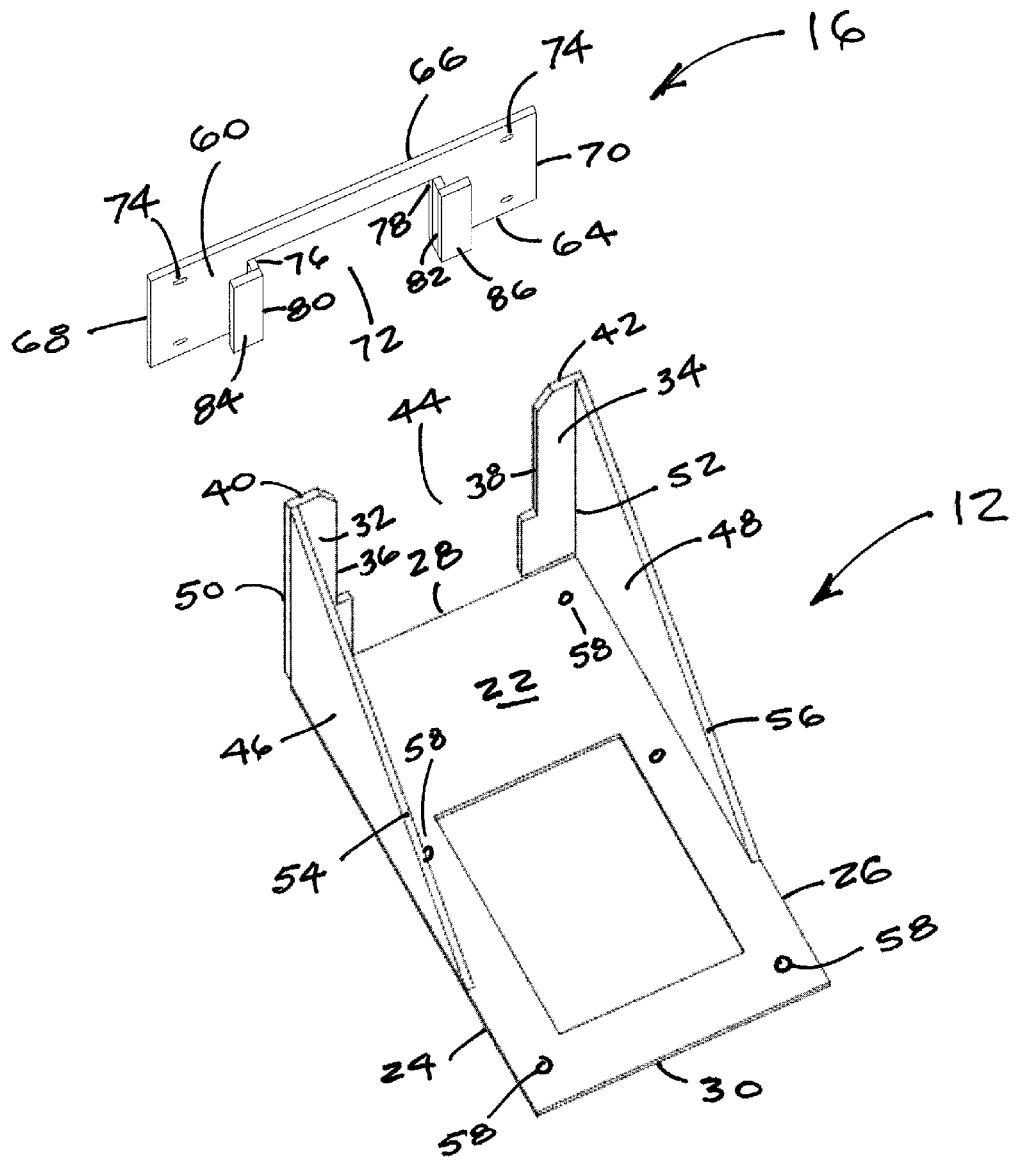
FIG. 2 is a perspective view of the lower mounting bracket and the mounting bracket shown in FIG. 1.

FIG. 2 shows the mounting bracket 12 and the lower mounting bracket 16. The mounting bracket 12 has a base 22 with a pair of opposing sides 24, 26, a first end 28, a second end 30 and first and second arms 32, 34 having first and second edges 36, 38, respectively. The arms 32, 34 extend outwardly from the first end 28 of the base 22 to distal ends 40, 42, and define a channel 44 therebetween. The mounting bracket 12 can have a pair of side walls 46, 48 extending from the opposing sides 24, 26 of the base 22 to a side 50, 52 of the first and second arms 32, 34 opposite the channel 44. Each of the pair of side walls 46, 48 has a triangular shape and connects to one of the opposing sides 24, 26 of the base 22 and the first or second arm 32, 34, respectively. The third sides 54, 56 extend between the first or second arm 32, 34 (near the distal end 40, 42) and one of the opposing sides 24, 26 of the base 22. One or more apertures 58 in the base 22 are used to attach the mounting bracket 12 to a loudspeaker enclosure 120 (see FIGS. 9-14).

FIG. 2 also shows the lower mounting bracket 16, which includes a lower plate 60 having a top surface 62, first and second sides 64, 66 extending between first and second ends 68, 70 and a U-shaped notch 72 in the first side 64. Preferably, the lower plate 60 is substantially rectangular and flat and has at least one aperture 74 on either side of the U-shaped notch 72 for attachment of the lower mounting bracket 16 to at least one of the plurality of vibration isolators 20. The U-shaped notch 72 has opposing side edges 76, 78 that are parallel to the first and second ends 68, 70 of the lower plate 60. First and second walls 80, 82 are connected to the opposing side edges 76, 78 of the U-shaped notch 72 and extend downwardly from the top surface 62 of the lower plate 60 to first and second lips 84, 86 that extend away from the U-shaped notch 72 to form first and second tracks 88, 90, which are open on one side and bounded by the lower plate 60, the first or second walls 80, 82 and the first or second lips 84, 86, respectively (also see FIG. 5). The lips 84, 86 in combination with the lower plate 60 and the first or second walls 80, 82 form first and second tracks 88, 90 that are open on one side. When the sub-assembly 14 (FIG. 1) is attached to the mounting bracket 12, the tracks 88, 90 slidably receive the edges 36, 38 of the first and second arms 32, 34.

Figure 3:
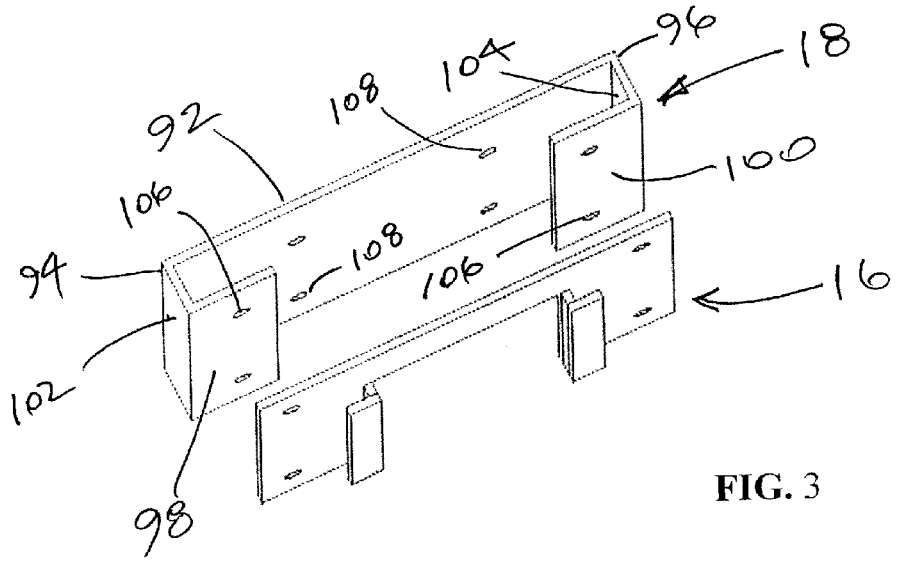
FIG. 3 is a perspective view of the lower mounting bracket and the upper mounting bracket shown in FIG. 1.
Figure 4:
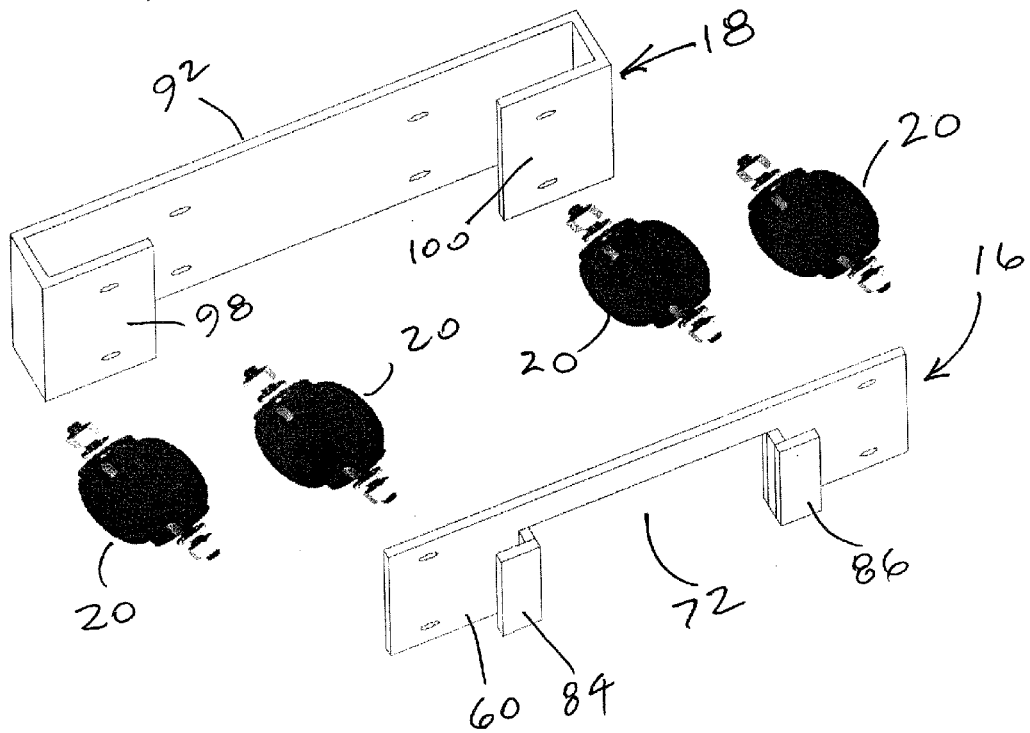
FIG. 4 is an exploded perspective view of the lower mounting bracket, the upper mounting bracket and the four vibration isolators shown in FIG. 1.

FIG. 3 shows the lower mounting bracket 16 and upper mounting bracket 18 and FIG. 4 shows an exploded view of the lower mounting bracket 16 and upper mounting bracket 18 with four vibration isolators 20 disposed in between. The upper mounting bracket 18 includes an upper plate 92 having first and second ends 94, 96 and first and second bottom wall sections 98, 100 connected to the first and second ends 94, 96 by first and second end walls 102, 104. The first and second bottom wall sections 98, 100 extend parallel to and below the upper plate 92. Preferably, the first and second bottom wall sections 98, 100 each have one or more apertures 106 for attachment of the upper mounting bracket 18 to one or more vibration isolators 20. The upper plate 92 also has one or more apertures 108 that are used to attach the upper mounting bracket 18 to a second enclosure 122 of the audio loudspeaker system (FIGS. 9-14).

Figure 5:
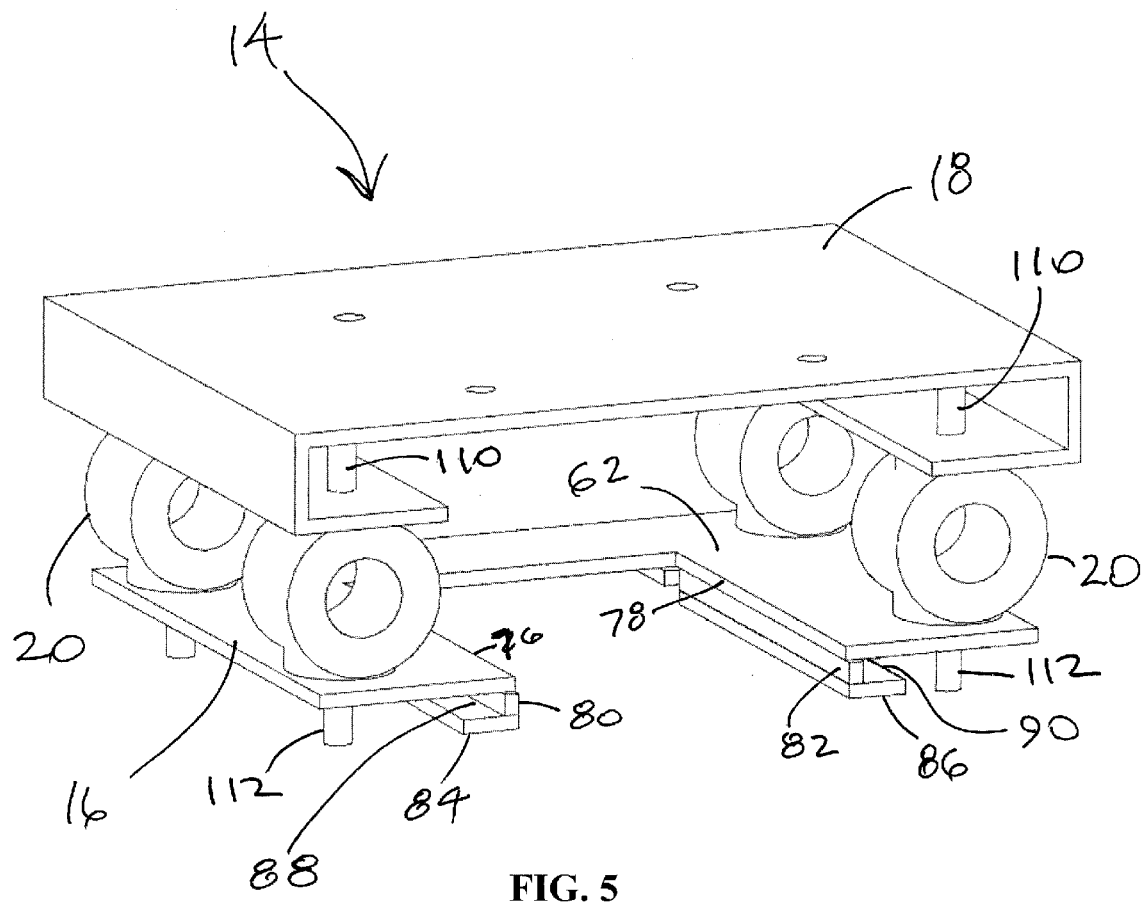
FIG. 5 is a side perspective view of the sub-assembly shown in FIG. 1, including the lower mounting bracket, the upper mounting bracket and four vibration isolators.

FIG. 5 shows the sub-assembly 14, which includes the lower mounting bracket 16 and the upper mounting bracket 18 with four vibration isolators 20 disposed therebetween. The vibration isolators 20 can be connected to the lower mounting bracket 16 and the upper mounting bracket 18 by studs 110, 112 extending from opposite sides of the vibration isolators 20. The studs 110, 112 can be inserted into the apertures 74 of the lower plate 60 and into the apertures 106 of the first and second bottom wall sections 98, 100 and frictionally secured as shown. In another embodiment (FIGS. 6-8), the studs 110, 112 are threaded and secured by nuts 114, 116.

Figure 8:
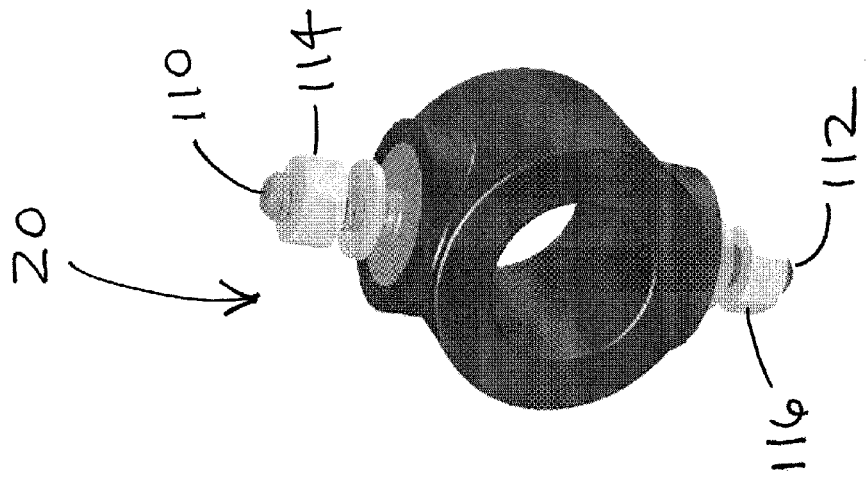
FIG. 8 is a front perspective view of a vibration isolator.
Figure 7:
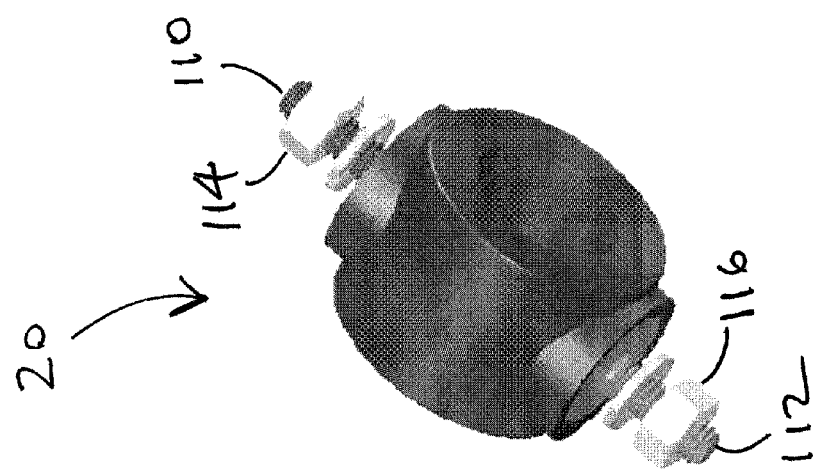
FIG. 7 is a side perspective view of a vibration isolator.
Figure 6:
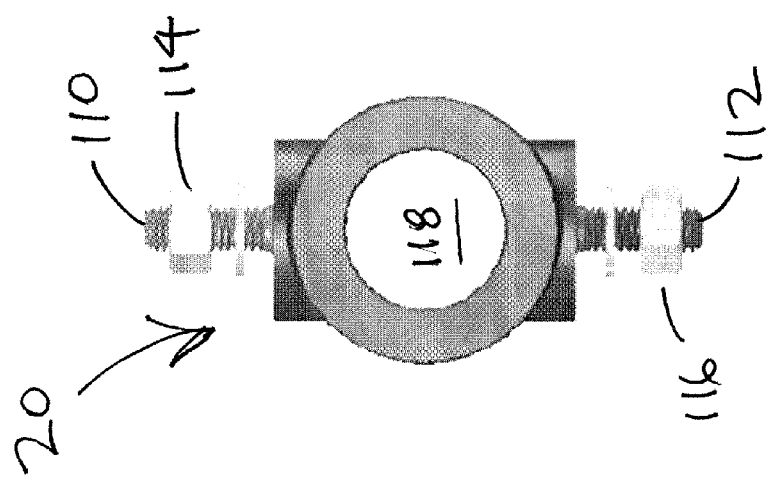
FIG. 6 is a front view of a vibration isolator.

FIGS. 6-8 show vibration isolators 20 with threaded studs 110, 112 extending from opposing sides and nuts 114, 116 installed on the studs 110, 112. The vibration isolators 20 are made of a compressible material, such as rubber, which dampens the vibration between the lower mounting bracket 16 and the upper mounting bracket 18. In the embodiment shown in FIGS. 6-8, the vibration isolator 20 has an opening 118 that further dampens the vibration.

Figure 9:
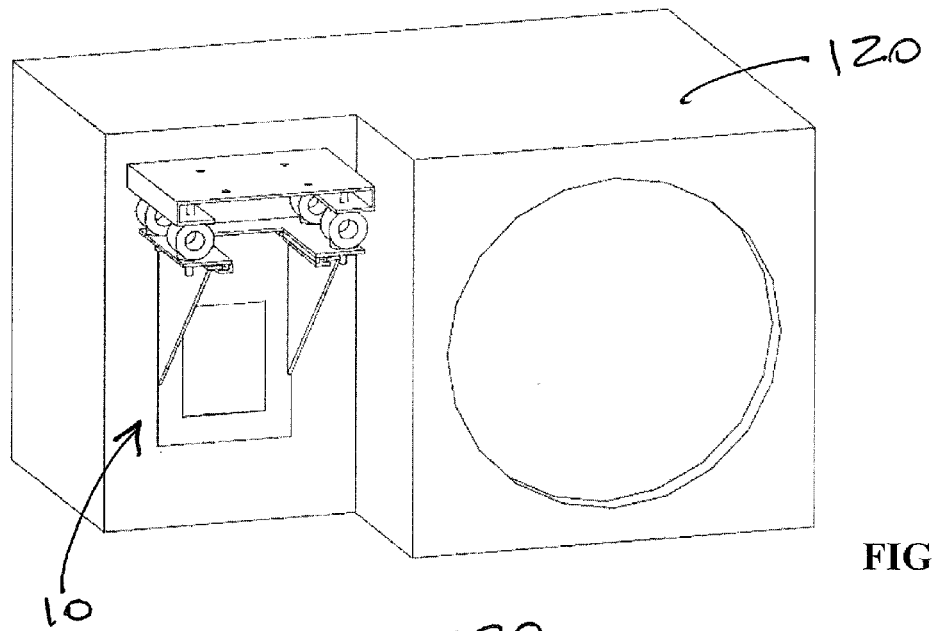
FIG. 9 is a front perspective view of the bracket assembly shown in FIG. 1 mounted on the left side of an audio loudspeaker enclosure.
Figure 10:
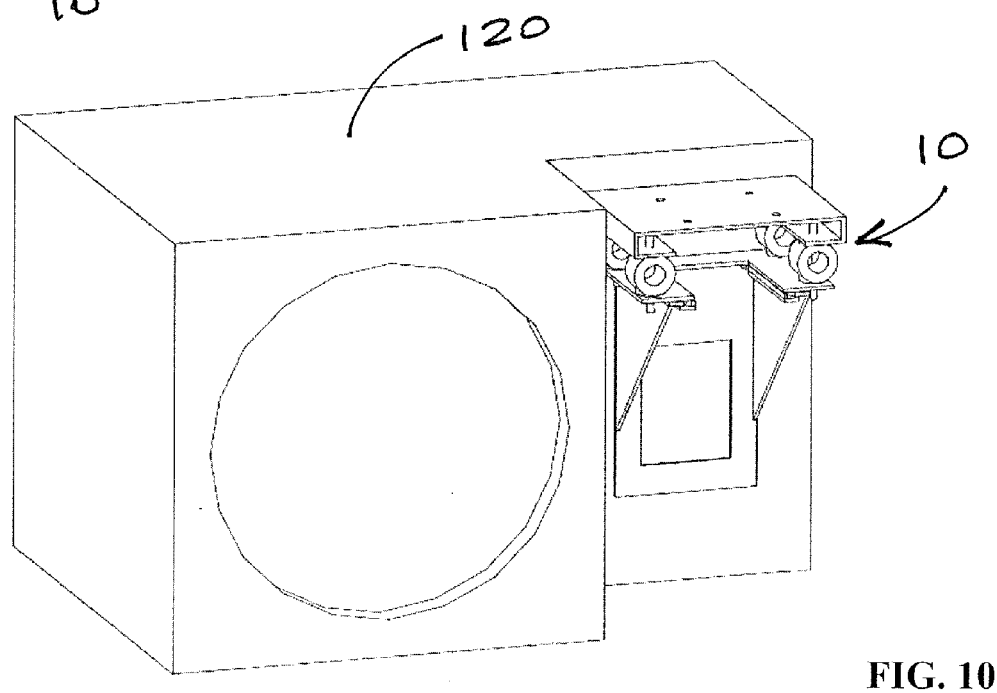
FIG. 10 is a front perspective view of the bracket assembly shown in FIG. 1 mounted on the right side of an audio loudspeaker enclosure.
Figure 11:
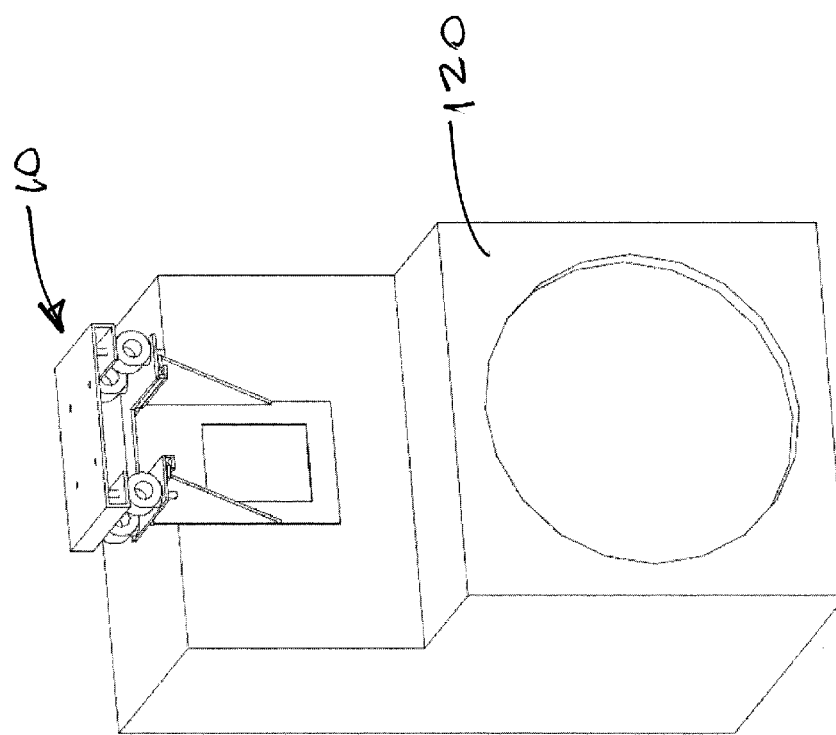
FIG. 11 is a front perspective view of the bracket assembly shown in FIG. 1 mounted on the top side of an audio loudspeaker enclosure.
Figure 12:
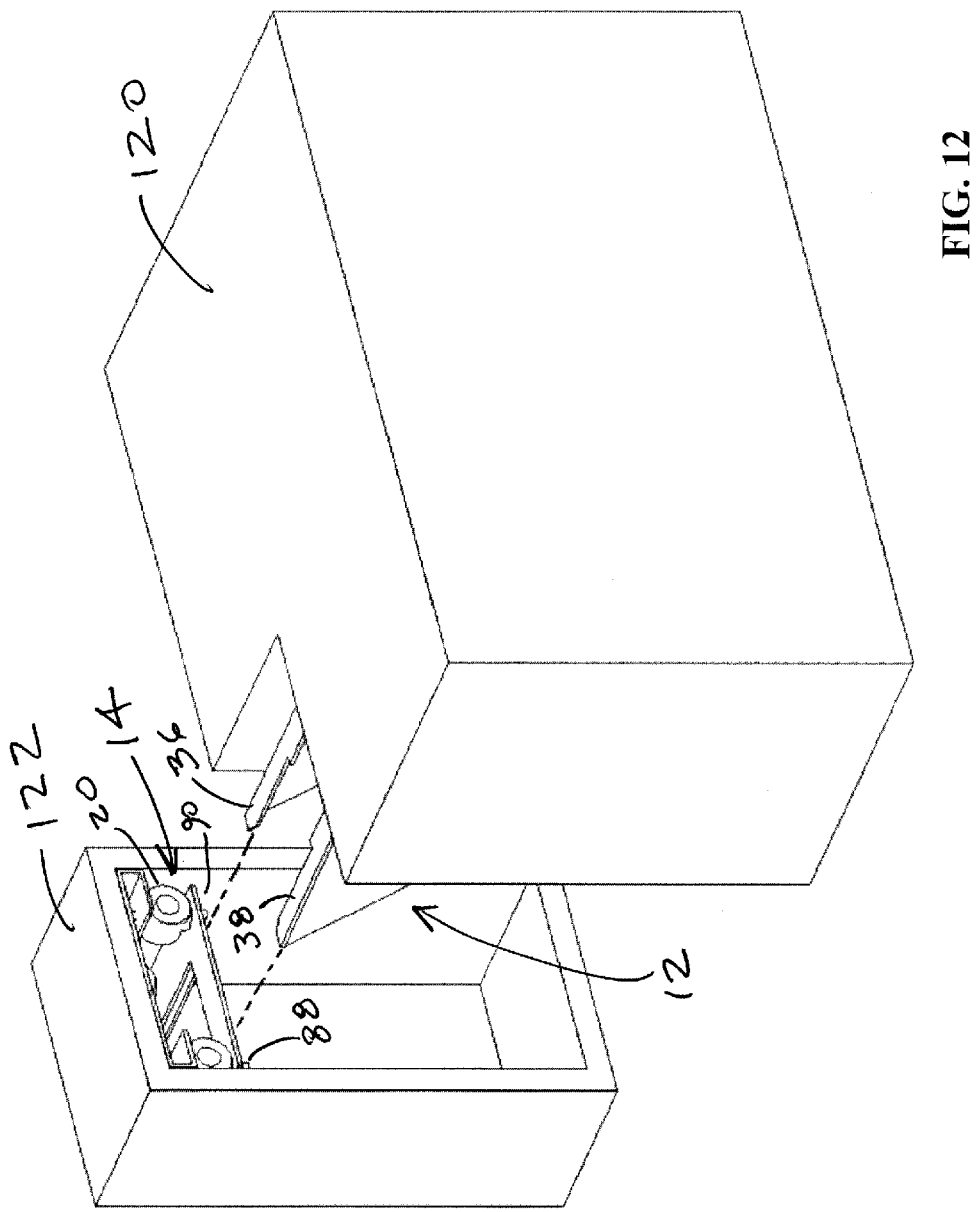
FIG. 12 is a rear perspective view of the mounting bracket attached to the right side of a first audio loudspeaker enclosure (as viewed from the front) being slidably inserted into the sub-assembly attached to a second audio loudspeaker enclosure.
Figure 13:
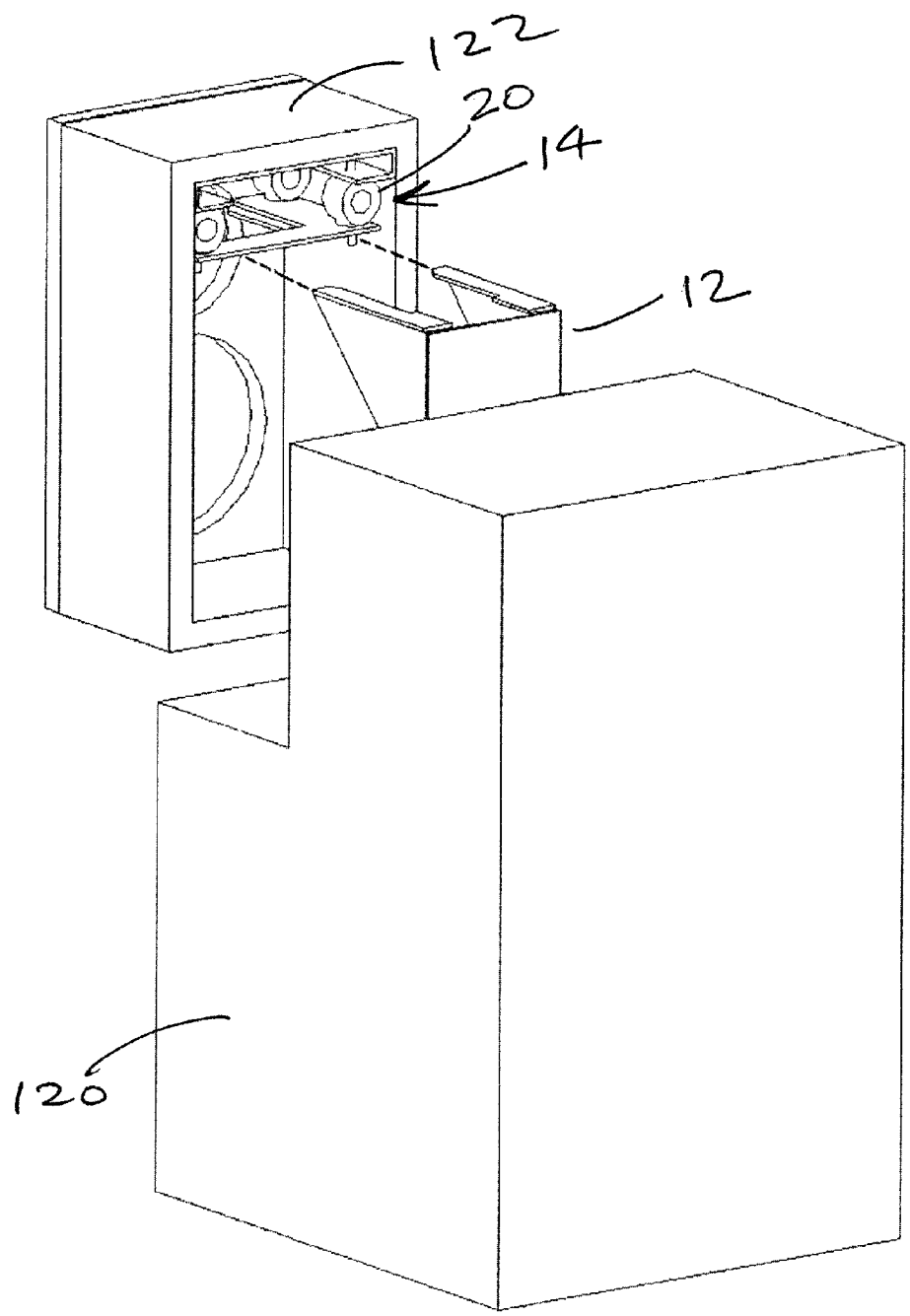
FIG. 13 is a rear perspective view of the mounting bracket attached to the top side of a first audio loudspeaker enclosure being slidably inserted into the sub-assembly attached to a second audio loudspeaker enclosure.
Figure 14:
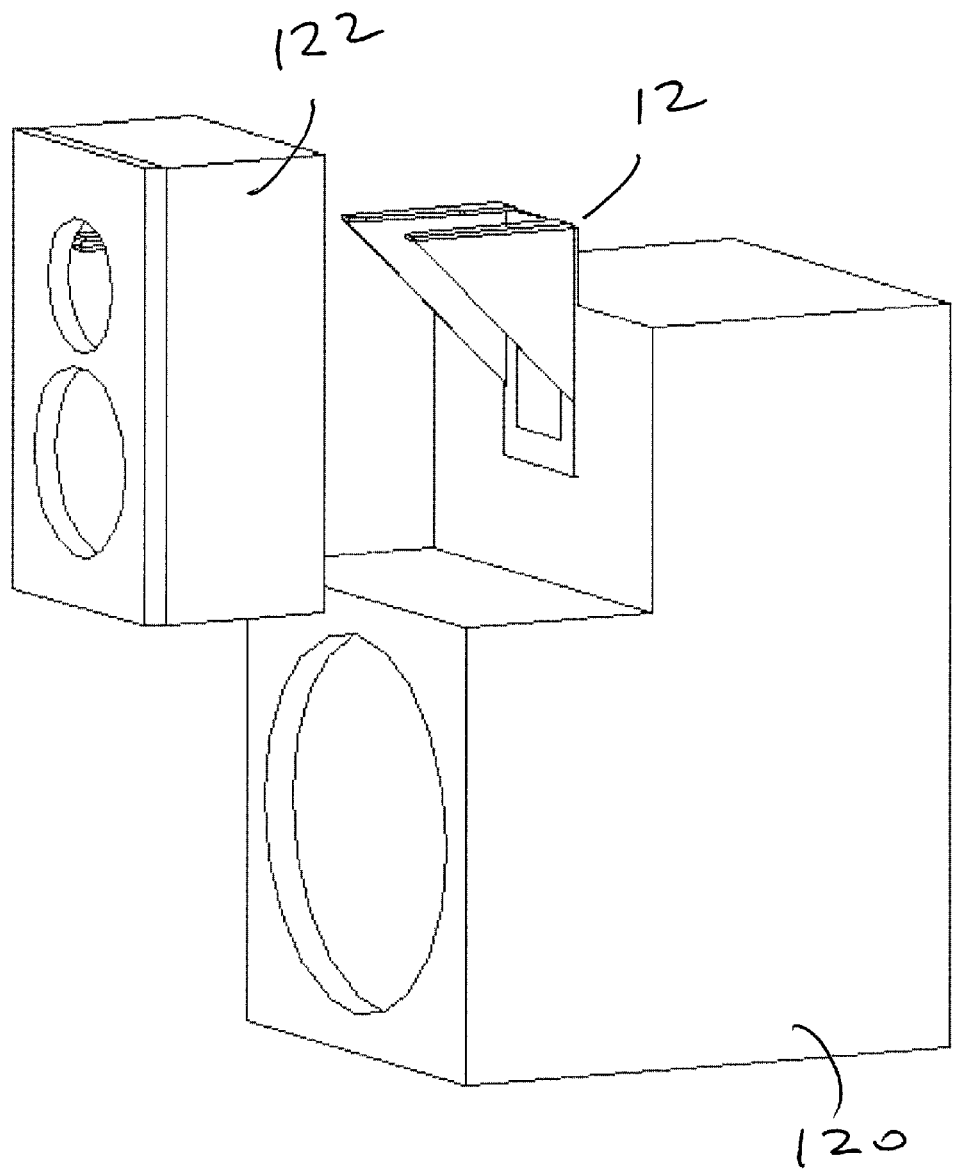
FIG. 14 is a front perspective view of the mounting bracket attached to the top side of a first audio loudspeaker enclosure being slidably inserted into the sub-assembly attached to a second audio loudspeaker enclosure.

FIGS. 9 and 10 show the bracket assembly 10 mounted on the left and right sides, respectively, of an audio loudspeaker enclosure 120. In FIG. 11, the bracket assembly 10 is mounted on the top side of an audio loudspeaker enclosure 120. FIGS. 12-14 show the mounting bracket 12 attached to a first enclosure 120 and the sub-assembly 14 attached to a second enclosure 122. FIG. 12 illustrates how the arms 36, 38 on the mounting bracket 12 are slidably inserted into the tracks 88, 90 of the lower mounting bracket 16 to attach the first and second enclosures 120, 122 together. Any vibrations in the first enclosure 120 are isolated from the second enclosure 122 by the vibration isolators 20.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A bracket assembly for an audio loudspeaker system, the bracket assembly comprising:
   a mounting bracket comprising a base with a pair of opposing sides, a first end and a second end and first and second arms having first and second edges, respectively, and extending outwardly from the first end of the mounting bracket to distal ends, wherein the arms define a channel therebetween and the edges extend into the channel, and wherein the mounting bracket is adapted for attachment to a first enclosure of the audio loudspeaker system; and
   a sub-assembly comprising:
      a lower mounting bracket comprising a lower plate having a top surface and a bottom surface and first and second tracks connected to the bottom surface;
      an upper mounting bracket comprising an upper plate having first and second ends, wherein the upper mounting bracket is adapted for attachment to a second enclosure of the audio loudspeaker system; and
      a plurality of vibration isolators disposed between the lower mounting bracket and the upper mounting bracket,
   wherein the first and second tracks of the lower mounting bracket slidably receives the first and second edges of the arms of the mounting bracket to attach the second enclosure to the first enclosure.

2. The bracket assembly according to claim 1, wherein the lower plate also has first and second sides extending between first and second ends and a U-shaped notch in the first side, and wherein the U-shaped notch has opposing first and second walls that are parallel to the first and second ends of the lower plate and extend downwardly from the top surface of the lower plate to lips that extend away from the U-shaped notch to form the first and second tracks.

3. The bracket assembly according to claim 1, wherein the lower plate is substantially rectangular and flat.

4. The bracket assembly according to claim 2, wherein the lower plate has at least one aperture on either side of the U-shaped notch for attachment of the lower mounting bracket to at least one of the plurality of vibration isolators.

5. The bracket assembly according to claim 1, wherein the upper mounting bracket comprises first and second bottom wall sections connected to the first and second ends of the upper plate by first and second end walls, wherein the first and second bottom wall sections extend parallel to and below the upper plate.

6. The bracket assembly according to claim 5, wherein the first and second bottom wall sections each have at least one aperture for attachment of the upper mounting bracket to at least one of the plurality of vibration isolators.

7. The bracket assembly according to claim 1, wherein each of the plurality of vibration isolators is compressible.

8. The bracket assembly according to claim 6, wherein each of the plurality of vibration isolators has two fasteners located on opposite sides of the vibration isolator, and wherein one fastener is inserted into one of the apertures in the lower plate and one fastener is inserted into one of the apertures in one of the bottom wall sections of the upper mounting bracket.

9. The bracket assembly according to claim 1, wherein the mounting bracket has a pair of side walls extending from the opposing sides of the base to a side of the first and second arms opposite the first and second edges.

10. The bracket assembly according to claim 9, wherein each of the pair of side walls has a triangular shape with first and second sides connecting to one of the opposing sides of the base and the first or second arm, respectively, and a third side that extends between the first or second arm and one of the opposing sides of the base.

11. A bracket assembly for an audio loudspeaker system, the bracket assembly comprising:
a mounting bracket comprising a base with a pair of opposing sides, a first end and a second end and first and second arms having first and second edges, respectively, and extending outwardly from the first end of the mounting bracket to distal ends, wherein the arms define a channel therebetween and the edges extend into the channel, and wherein the mounting bracket is adapted for attachment to a first enclosure of the audio loudspeaker system; and
a sub-assembly comprising:
a lower mounting bracket comprising a lower plate having a top surface, first and second sides extending between first and second ends and a U-shaped notch in the first side, wherein the U-shaped notch has opposing side edges that are parallel to the first and second ends of the lower plate, wherein first and second walls are connected to the opposing side edges of the U-shaped notch and extend downwardly from the top surface of the lower plate to first and second lips that extend away from the U-shaped notch to form first and second tracks;
an upper mounting bracket comprising an upper plate having first and second ends and first and second bottom wall sections connected to the first and second ends by first and second end walls, wherein the first and second bottom wall sections extend parallel to and below the upper plate, and wherein the upper mounting bracket is adapted for attachment to a second enclosure of the audio loudspeaker system; and
a plurality of compressible vibration isolators disposed between the lower mounting bracket and the upper mounting bracket,
wherein the first and second tracks of the lower mounting bracket slidably receive the first and second edges of the mounting bracket.

12. The bracket assembly according to claim 11, wherein the mounting bracket base, the lower plate and the upper plate are substantially rectangular and flat.

13. The bracket assembly according to claim 11, wherein the lower plate has at least one aperture on either side of the U-shaped notch for attachment of the lower mounting bracket to at least one of the plurality of vibration isolators.

14. The bracket assembly according to claim 13, wherein the first and second bottom wall sections each have at least one aperture for attachment of the upper mounting bracket to at least one of the plurality of vibration isolators.

15. The bracket assembly according to claim 14, wherein each of the plurality of vibration isolators has two fasteners located on opposite sides of the vibration isolator, and wherein one fastener is inserted into one of the apertures in the lower plate and one fastener is inserted into one of the apertures in one of the bottom wall sections of the upper mounting bracket.

16. The bracket assembly according to claim 11, wherein the mounting bracket has first and second side walls extending from the opposing sides of the base to a side of the first and second arms opposite the first and second edges.

17. The bracket assembly according to claim 16, wherein each of the first and second side walls has a triangular shape with first and second sides connecting to one of the opposing sides of the base and the first or second arm, respectively, and a third side that extends between the first or second arm and one of the opposing sides of the base.

18. A bracket assembly for an audio loudspeaker system, the bracket assembly comprising:
a mounting bracket comprising a base with a pair of opposing sides, a first end and a second end, first and second side walls and first and second arms having first and second edges, respectively, and extending outwardly from the first end of the mounting bracket to distal ends, wherein the arms define a channel therebetween and the edges extend into the channel, wherein the first and second side walls extend from the opposing sides of the base to a side of the first and second arms, respectively, opposite the first and second edges, and wherein the mounting bracket is adapted for attachment to a first enclosure of the audio loudspeaker system; and
a sub-assembly comprising:
a lower mounting bracket comprising a lower plate having a top surface, first and second sides extending between first and second ends, a plurality of apertures and a U-shaped notch in the first side, wherein the U-shaped notch has opposing side edges that are parallel to the first and second ends of the lower plate, wherein first and second walls are connected to the opposing side edges of the U-shaped notch and extend downwardly from the top surface of the lower plate to first and second lips that extend away from the U-shaped notch to form first and second tracks;

an upper mounting bracket comprising an upper plate having first and second ends, first and second bottom wall sections connected to the first and second ends of the upper plate by first and second end walls, wherein the first and second bottom wall sections each have at least two apertures and extend parallel to and below the upper plate, and wherein the upper mounting bracket is adapted for attachment to a second enclosure of the audio loudspeaker system; and four compressible vibration isolators, wherein each of the vibration isolators has first and second threaded studs located on opposite sides of the vibration isolator, and wherein the first threaded stud is inserted into one of the apertures in the lower plate and secured by a first nut and the second threaded stud is inserted into one of the apertures in one of the bottom wall sections of the upper mounting bracket and secured by a second nut to attach the lower mounting bracket to the upper mounting bracket, wherein the first and second tracks of the lower mounting bracket slidably receive the first and second edges of the mounting bracket to attach the sub-assembly to the mounting bracket.

19. The bracket assembly according to claim 18, wherein each of the first and second side walls has a triangular shape with first and second sides connecting to one of the opposing sides of the base and the first or second arm, respectively, and a third side that extends between the first or second arm and one of the opposing sides of the base.

20. The bracket assembly according to claim 18, wherein the mounting bracket base, the lower plate and the upper plate are substantially rectangular and flat.

\* \* \* \* \*